United States Patent [19]

Simmering

[11] Patent Number: 5,471,744
[45] Date of Patent: Dec. 5, 1995

[54] TOOL FOR REMOVING INSULATION FROM SUBSTANTIALLY RIGID ELECTRICAL CONDUCTORS

[75] Inventor: Lisa Simmering, Fair Play, S.C.

[73] Assignee: Square D Company, Palatine, Ill.

[21] Appl. No.: 148,800

[22] Filed: Nov. 8, 1993

[51] Int. Cl.[6] ........................................... H02G 1/12
[52] U.S. Cl. ............................ 30/90.6; 30/90.1; 81/9.4
[58] Field of Search ............................ 30/90.1, 90.4, 30/90.6, 90.7, 90.8; 81/9.4

[56] References Cited

U.S. PATENT DOCUMENTS 4,947,549  8/1990  Genovese et al. ....................... 30/90.8

FOREIGN PATENT DOCUMENTS

| | | | |
|---|---|---|---|
| 219112 | 1/1962 | Austria | 30/90.1 |
| 2342243 | 3/1974 | Germany | 81/9.4 |
| 2416894 | 10/1975 | Germany | 30/90.1 |
| 316004 | 10/1956 | Switzerland | 30/90.4 |

*Primary Examiner*—Richard K. Seidel
*Assistant Examiner*—Raymond D. Woods
*Attorney, Agent, or Firm*—Larry I. Golden; David Russell Stacey; Larry Schrout

[57] ABSTRACT

An insulation stripping tool of the present invention removes insulation from the free ends of a substantially rigid electrical conductor. The tool has a barrel at one end and a handle at the other end. The barrel is generally tubular in shape and longitudinally receives a free end of the substantially rigid insulated electrical conductor. An insulation cutter is captivated within the barrel for cutting off a predetermined length of insulation from the free end of the conductor.

5 Claims, 4 Drawing Sheets

5,471,744

TOOL FOR REMOVING INSULATION FROM SUBSTANTIALLY RIGID ELECTRICAL CONDUCTORS

FIELD OF THE INVENTION

The present invention relates to the field of insulated electrical conductors, and specifically to the removal of electrical insulation from the free ends of a substantially rigid conductor.

BACKGROUND OF THE INVENTION

Electrical insulation stripping tools are well known in the art of electrical wiring. These tools are designed to remove the electrical insulation from the free ends of wires or cables in order to permit an electrical connection. These tools generally have cutting blades which clamp about the insulated conductor and cut the insulation. These blades are generally attached to the ends of pivotal arms which move in response to manual operation of the opposite ends of the pivotal arms. These insulation strippers work very well when adequate space is provided or where the conductor is sufficiently flexible to permit use of the tool. In many instances the end of the conductor is in a confined space where the clamping type stripper will not fit or the conductor is substantially rigid and therefore can not be manipulated to a position that the stripper can engage the end of the conductor. In these instances a small easily operated stripping tool is required.

SUMMARY OF THE INVENTION

The present invention provides an insulation stripping tool for substantially rigid conductors which will operate in a confined space and is simple to operate. The stripping tool of the present invention is designed to be received longitudinally over the free end of an insulated substantially rigid electrical conductor and then rotated to cut the insulation. The stripper has a generally cylindrical body made from two halves which captivate an easily replaceable insulation cutter. The cylindrical body has a barrel end which receives the free end of the insulated conductor and a closed end which forms a stop for the free end of the conductor. The insulation cutter is fixed at a predetermined distance from the closed end such that only a predetermined length of insulation is removed from the free end of the conductor thereby providing a contact surface of predetermined length.

Other features and advantages of the invention will become apparent to those skilled in the art upon review of the following detailed description, claims and drawings.

Figure 1:
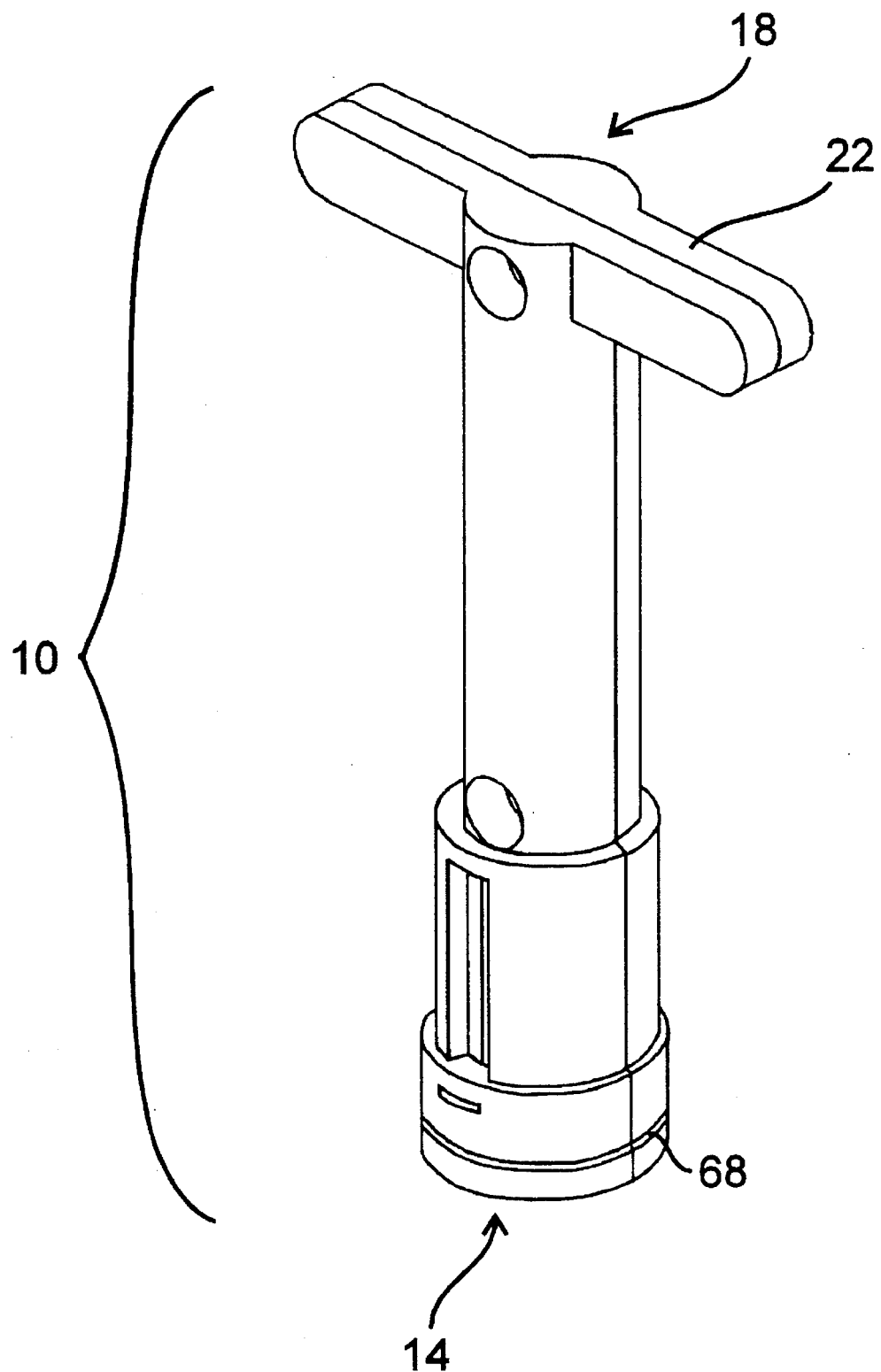
FIG. 1 is an isometric view of an insulation stripping tool of the present invention.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates a first embodiment of the insulation stripping tool of the present invention generally indicated by the reference numeral 10. The tool 10 is generally T-shaped having a barrel end 14 and a handle end 18. The barrel end 14 longitudinally receives the free end of the insulated electrical conductor to be stripped and the handle end 18 has a hand bar 22 which provides a lever for easier turning of the stripping tool 10 on the conductor.

Figure 2:
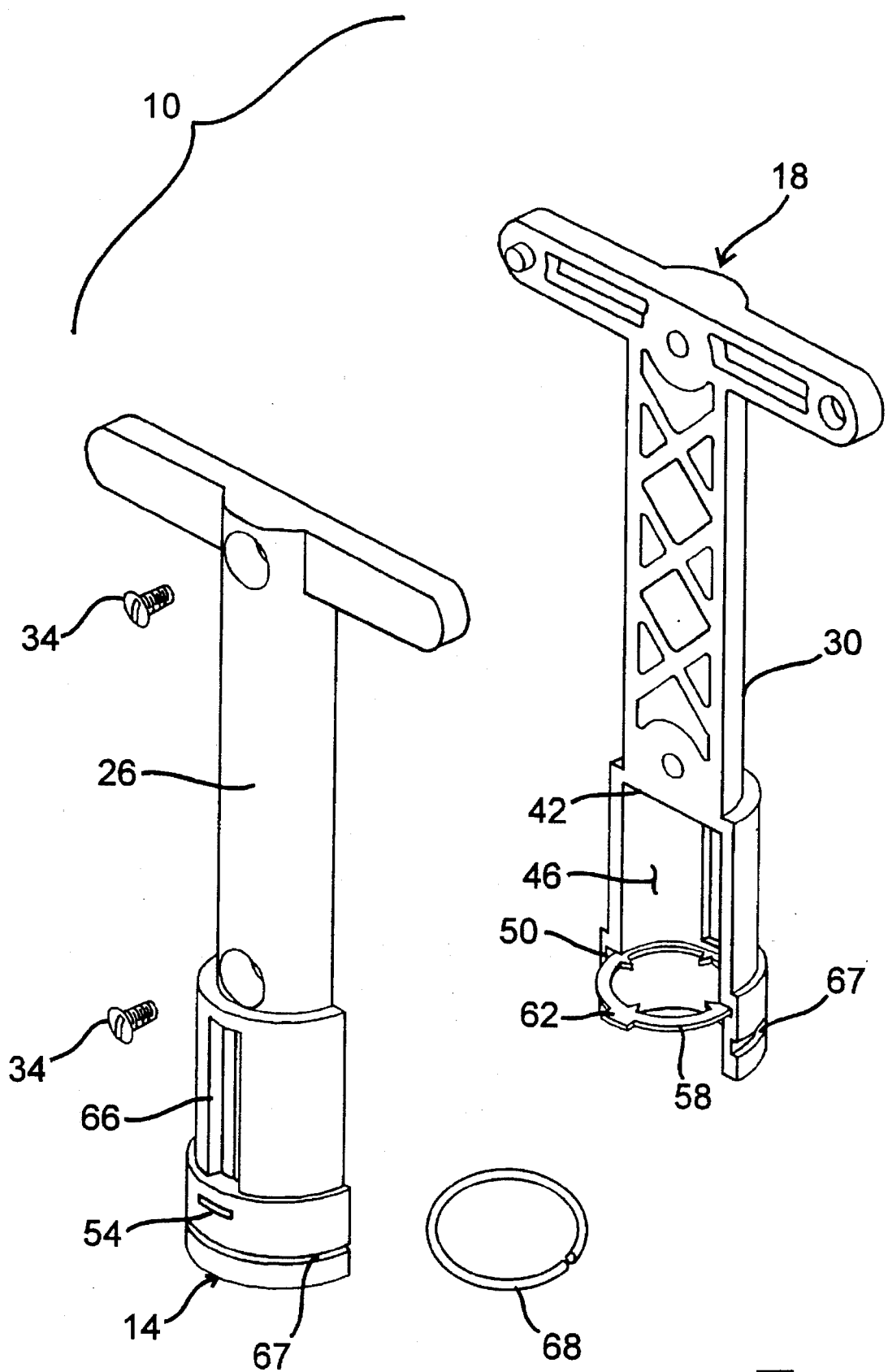
FIG. 2 is an exploded view of the insulation stripping tool of FIG. 1.

Referring now to FIG. 2, the stripping tool 10 is made from a first body half 26 and a second body half 30, which can be made from identical parts. The first and second body halves, 26 and 30, respectively, are held together by means such as screws 34. The barrel end 14 is generally tubular in shape and has an open end 38 and a closed end 42. A substantially cylindrical receiving passage 46 connects the open end 38 to the closed end 42. The receiving passage 46 has a cross-section dimensioned to closely receive the free end of a substantially rigid insulated conductor having a particular diameter. The closed end 42 forms a conductor stop such that the length of the conductor entering the receiving passage 46 is predetermined. The receiving passage 46 includes a circumferential retaining groove 50 located at a predetermined distance from the closed end 42. The retaining groove 50 includes a locking slot 54 in each of the first and second body halves 26 and 30, respectively. A replaceable insulation cutter 58 is received within the retaining groove 50. The insulation cutter 58 has at least one locking tab 62 which is received in a locking slot 54 to captivate the insulation cutter 58 and prevent it from rotating in the retaining groove 50. The receiving passage 46 also includes a longitudinal slot 66 in each of the first and second body halves, 26 and 30, respectively. The slot 66 extends from the closed end 42 to a point near the retaining slot 50 and passes through the barrel end 14 to facilitate the removal of any portions of insulation which might remain in the receiving passage 46 after stripping a conductor. The barrel end 14 also has a circumferential slot 67 on its outside surface for receiving a retaining ring 68 which prevents the two halves, 26 and 30, of the barrel end 14 from separating.

Figure 3:
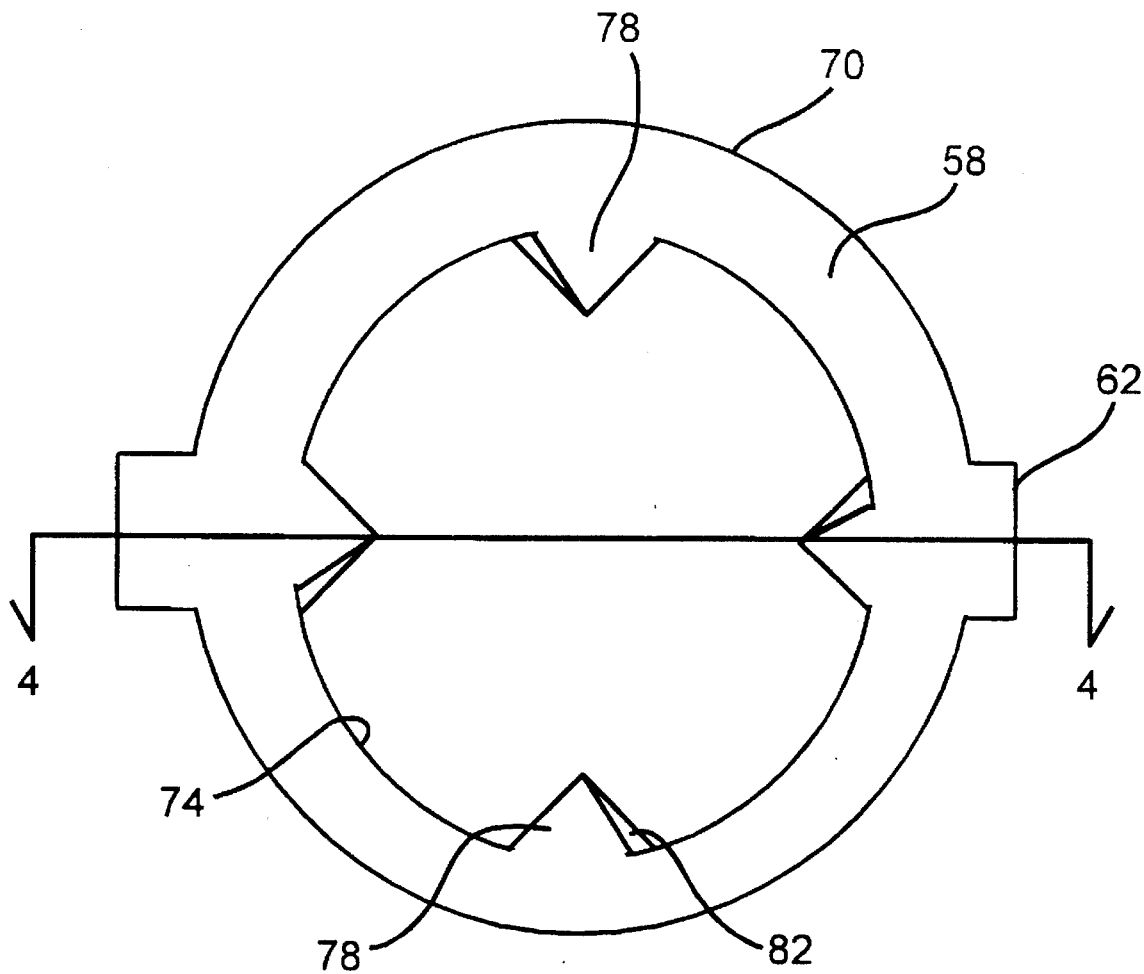
FIG. 3 is a view of a typical insulation cutter of the present invention.
Figure 4:
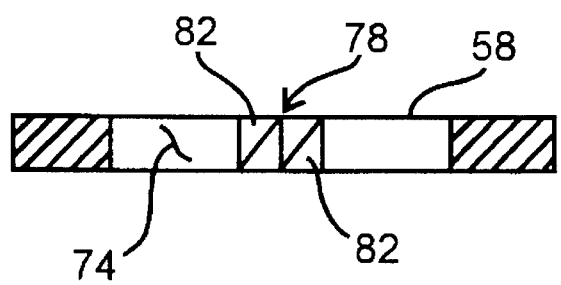
FIG. 4 is a detail view of a cutting blade of the insulation cutter of FIG. 3.

Referring now to FIG. 3, the insulation cutter 58 is generally flat and washer-like in shape having an outside edge 70 having a preselected diameter and an inside edge 74 having a smaller preselected diameter. The locking tabs 62 extend outwardly from the outside edge 70 and one or more sharply pointed blades 78 extend inwardly from the inside edge 74. The blades 78 have a leading edge 82 to facilitate easier cutting of the insulation as the stripping tool 10 is rotated about the conductor to be stripped. As shown in FIGS. 3 and 4, the leading edge 82 is provided on opposite sides of the blade 78. As an alternate means of obtaining a leading edge the blades 78 may be angled slightly with respect to the insulation cutter 58.

When the conductor engages the closed end 42, the blades 78 will cut the insulation circumferentially around the conductor at the predetermined distance from the end of the conductor. The stripping tool 10 may then be removed from the conductor leaving an electrical contact surface of a predetermined length.

Figure 5:
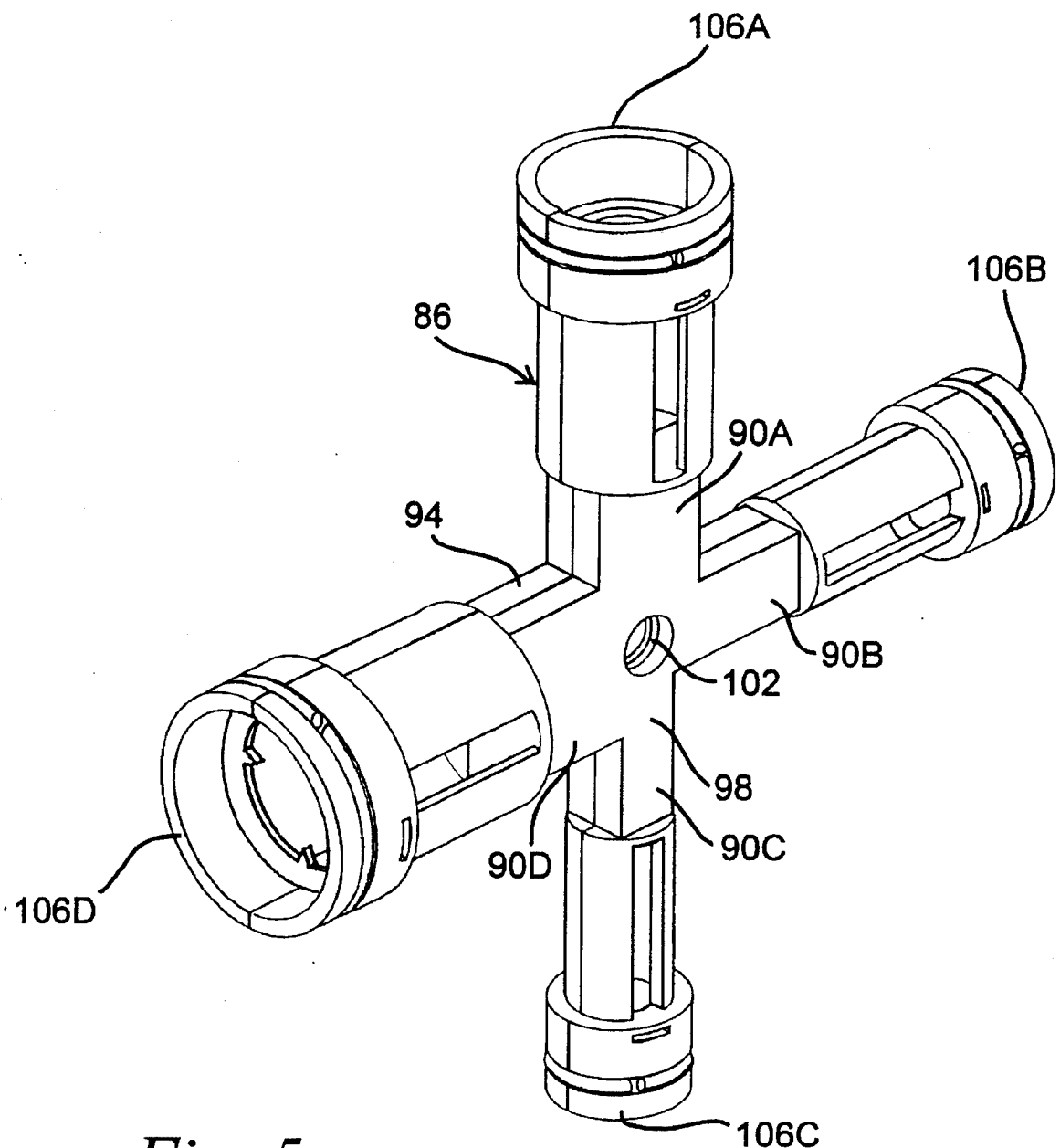
FIG. 5 is an isometric view of a second embodiment of an insulation stripping tool of the present invention.

Referring now to FIG. 5 a second embodiment of the stripping tool of the present invention is illustrated and generally indicated by the reference numeral 86. The stripping tool 86 operates in the same manner and includes the same basic components as the previously described stripping tool 10, except that stripping tool 86 is generally cross-shaped having four legs 90A, 90B, 90C and 90D that are connected together at a common point. The tool 86 is made from a first body half 94 and a second body half 98. However, the body halves 94 and 98 are complementary, not identical as in tool 10. The first and second body halves 94 and 98 respectively are held together by a screw 102. Each of the legs 90A, 90B, 90C and 90D has an associated barrel end 106A, 106B, 106C and 106D. Each of the barrel ends 106A, 106B, 106C and 106D contains all of the elements of the barrel end 14 of the above-described tool 10 illustrated in FIG. 2. However, each of the barrel ends 106A, 106B, 106C and 106D has a different diameter such that each barrel end 106A, 106B, 106C and 106D will receive and strip an insulated conductor having a diameter associated with that particular barrel end. The crossed legs 90A, 90B, 90C and 90D provide the same function as the hand bar 22 of the first embodiment by providing a lever for easier turning of the tool 86 on a conductor.

I claim:

1. An insulation stripping tool for removing a predetermined length of insulation from a free end of a substantially rigid electrical conductor, said tool comprising:

a first body half;

a second body half, mating with said first body half such that said first and second body halves define a body having at least one barrel end being generally tubular in shape and having an open end and a closed end spaced apart from said open end by a receiving passage, said open end being dimensioned for longitudinally receiving the free end of the substantially rigid insulated electrical conductor such that the free end of the conductor abuts said closed end, said first and second body halves also defining a hand bar being generally perpendicular to a longitudinal axis of said body, said hand bar for manually rotating said insulation stripping tool about the substantially rigid insulated electrical conductor;

an insulation cutter, located within said receiving passage at a predetermined distance from said closed end such that a predetermined length of insulation can be circumferentially cut from the free end of the electrical conductor;

means for positively captivating said insulation cutter within said receiving passage such that said insulation cutter maintains a fixed position with respect to said first and second body halves; and means for securing said first and second body halves together.

2. The insulation stripping tool of claim 1 wherein said insulation cutter is generally flat and washer-like in shape having a generally circular outside edge and a concentric generally circular inside edge having a diameter dimensioned to receive the substantially rigid insulated electrical conductor.

3. The insulation stripping tool of claim 2 wherein said means for captivating said insulation cutter in said receiving passage further comprises:

a portion of said receiving passage defining a circumferential retaining groove for receiving said insulation cutter, said groove located a predetermined distance from said closed end;

a locking slot in said circumferential retaining groove; and a locking tab extending outwardly from said outside edge of said insulation cutter for being received in said locking slot.

4. The insulation stripping tool of claim 2 wherein said insulation cutter further comprises:

at least one blade extending inward from said inside edge for cutting the insulation on the conductor.

5. The insulation stripping tool of claim 4 wherein said blade further includes a leading edge for facilitating easier cutting of the insulation on the conductor.

\* \* \* \* \*